US008059238B2

(12) United States Patent
Hu

(10) Patent No.: US 8,059,238 B2
(45) Date of Patent: Nov. 15, 2011

(54) TRANSFLECTIVE LIQUID CRYSTAL DISPLAY PANEL WITH INTEGRATED SWITCH ELEMENT AND COLOR FILTER LAYER ON A SUBSTRATE

(75) Inventor: Chih-Jen Hu, Hsinchu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 263 days.

(21) Appl. No.: 11/759,230

(22) Filed: Jun. 7, 2007

(65) Prior Publication Data
US 2008/0030659 A1    Feb. 7, 2008

(30) Foreign Application Priority Data

Aug. 2, 2006  (TW) .................. 95128294 A
Apr. 25, 2007  (TW) .................. 96114610 A

(51) Int. Cl.
*G02F 1/1335* (2006.01)
*G02F 1/1343* (2006.01)
(52) U.S. Cl. ........................ 349/114; 349/106; 349/38
(58) Field of Classification Search .......... 349/106–109, 349/114, 38, 39
See application file for complete search history.

(56) References Cited

U.S. PATENT DOCUMENTS

| 7,426,004 B2 * | 9/2008 | Hu et al. ................ 349/114 |
| 2002/0113927 A1 | 8/2002 | Ha |
| 2002/0176040 A1 | 11/2002 | Lim |
| 2005/0280754 A1 * | 12/2005 | Kume et al. ............ 349/106 |
| 2006/0038946 A1 * | 2/2006 | Yoshida et al. ......... 349/114 |
| 2006/0164575 A1 | 7/2006 | Su |

FOREIGN PATENT DOCUMENTS

| JP | 200678643 | 3/2006 |
| JP | 2006171752 | 6/2006 |
| TW | 574547 | 2/2004 |
| TW | 1227359 | 2/2005 |

* cited by examiner

*Primary Examiner* — Mark Robinson
*Assistant Examiner* — Michael Inadomi
(74) *Attorney, Agent, or Firm* — Winston Hsu; Scott Margo

(57) ABSTRACT

A transflective liquid crystal display panel includes a first substrate, a second substrate arranged opposite to the first substrate, and a plurality of pixels positioned between the first substrate and the second substrate. Each of the pixels having at least one reflecting region and at least one transmitting region includes a color filter layer formed on the substrate and located in both of the reflecting region and the transmitting region, at least one first reflective layer formed between the color filter layer and the substrate and located in the reflecting region, at least one switch element located in the reflecting region, and at least one second reflective layer located in the reflecting region.

17 Claims, 12 Drawing Sheets

TRANSFLECTIVE LIQUID CRYSTAL DISPLAY PANEL WITH INTEGRATED SWITCH ELEMENT AND COLOR FILTER LAYER ON A SUBSTRATE

BACKGROUND OF THE INVENTION

1. Field of the Invention

The invention relates to a transflective liquid crystal display panel, and more particularly, to a transflective liquid crystal display panel having integrated switch elements and a color filter layer on a substrate.

2. Description of the Prior Art

Liquid crystal displays are commonly utilized in various electronic products including personal computers, digital cameras, cell phones, PDAs, and projectors. As the market demand for display panels continues to increase, transflective liquid crystal displays having dual operating modes have become widely popular. Typically, a transflective liquid crystal display includes two operating modes: a reflective mode and a transmitting mode. In most circumstances, when the reflective mode is operating, light from the external environment is being used, whereas when the transmitting mode is operating, light generated from a backlight module is being used.

Typically, a transflective liquid crystal display panel is made up of a color filter substrate and an array substrate having corresponding electrodes thereon, and a liquid crystal layer disposed between the color filter substrate and the array substrate. The surface of the array substrate includes a plurality of thin film transistors as switch elements. Each of the thin film transistors includes a gate electrode connected to a scan line, a source electrode connected to a data line, and a drain electrode connected to a pixel electrode. The pixel electrodes are specifically composed of reflective electrodes and transparent electrodes, in which the reflective electrodes are utilized to form a reflective region of the display panel and the transparent electrodes are utilized to form a transmitting region of the display panel. The color filter substrate includes a black matrix layer, a color filter layer for displaying colors, and a transparent common electrode disposed on top surfaces of the black matrix layer and the color filter layer.

As the resolution of the liquid crystal display panel increases, the accuracy for the alignment between the color filter substrate and the array substrate also increases accordingly. If a shift occurs between the two substrates, a color representing a pixel region of the display panel is likely to be influenced by the color of the adjacent pixel region and result in a color-mixing phenomenon, which may further bring a light leakage phenomenon.

A technique commonly utilized for solving the above problem involves directly forming a color filter layer with colors such as red, blue, and green on the pixel region of an array substrate. However, those skilled in the art would know, if the color filter layer disposed on the array substrate produces any defects, the process for removing the color filter layer from the array substrate would become difficult as the solvents utilized already affect the devices located on the surface of the array substrate. Therefore, the method cannot rework the color filter layer on the array substrate, and the result not only wastes a large quantity of array substrates but also increases the overall fabrication cost.

SUMMARY OF THE INVENTION

It is an objective of the present invention to provide a transflective liquid crystal display panel for preventing the aforementioned color-mixing phenomenon.

It is another aspect of the present invention to provide a transflective liquid crystal display panel for increasing yield and reducing overall cost of the fabrication process.

It is another aspect of the present invention to provide a transflective liquid crystal display panel with improved reflective ability.

A transflective liquid crystal display panel is disclosed. The transflective liquid crystal display panel includes: a first substrate; a second substrate, disposed opposite to the first substrate; a liquid crystal layer, disposed between the first substrate and the second substrate; and a plurality of pixels arranged in a manner of a matrix between the first substrate and the second substrate, in which each of the pixels comprises a reflecting region and a transmitting region. Each of the pixels includes a color filter layer disposed on the first substrate and located in both the reflecting region and the transmitting region; a first reflective layer disposed between the color filter layer and the first substrate and located in the reflecting region; at least one switch element disposed in the reflecting region; and a second reflective layer disposed in the reflecting region.

Preferably, the fabrication of the color filter layer is completed before the fabrication for the thin film transistors. By performing the fabrication according to this order, the color filter can be reworked directly without affecting other devices. Additionally, by integrating both the color filter layer and the thin film transistor on a substrate, problem problems such as misalignment between two substrates can be reduced significantly. Moreover, a reflective layer can be disposed on the color filter layer of the reflective region for reflecting ambient lights without going through the color filter layer, thereby increasing the intensity of reflected lights and the reflectivity of the display panel.

These and other objectives of the present invention will no doubt become obvious to those of ordinary skill in the art after reading the following detailed description of the preferred embodiment that is illustrated in the various figures and drawings.

DETAILED DESCRIPTION

First Embodiment

Figure 1:
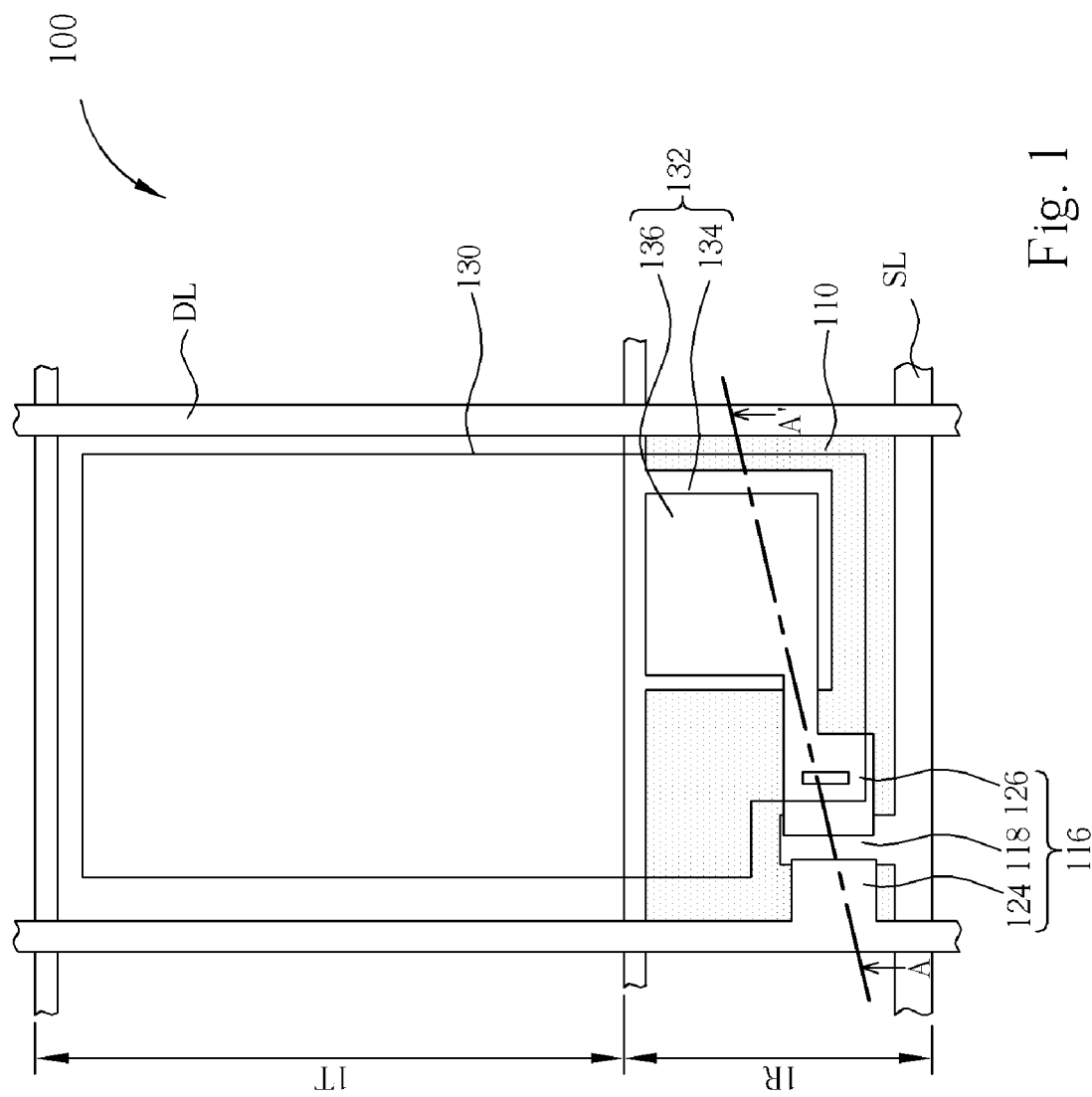
FIG. 1 illustrates a top-view of a pixel of a transflective liquid crystal display panel according to the first embodiment of the present invention.
Figure 2:
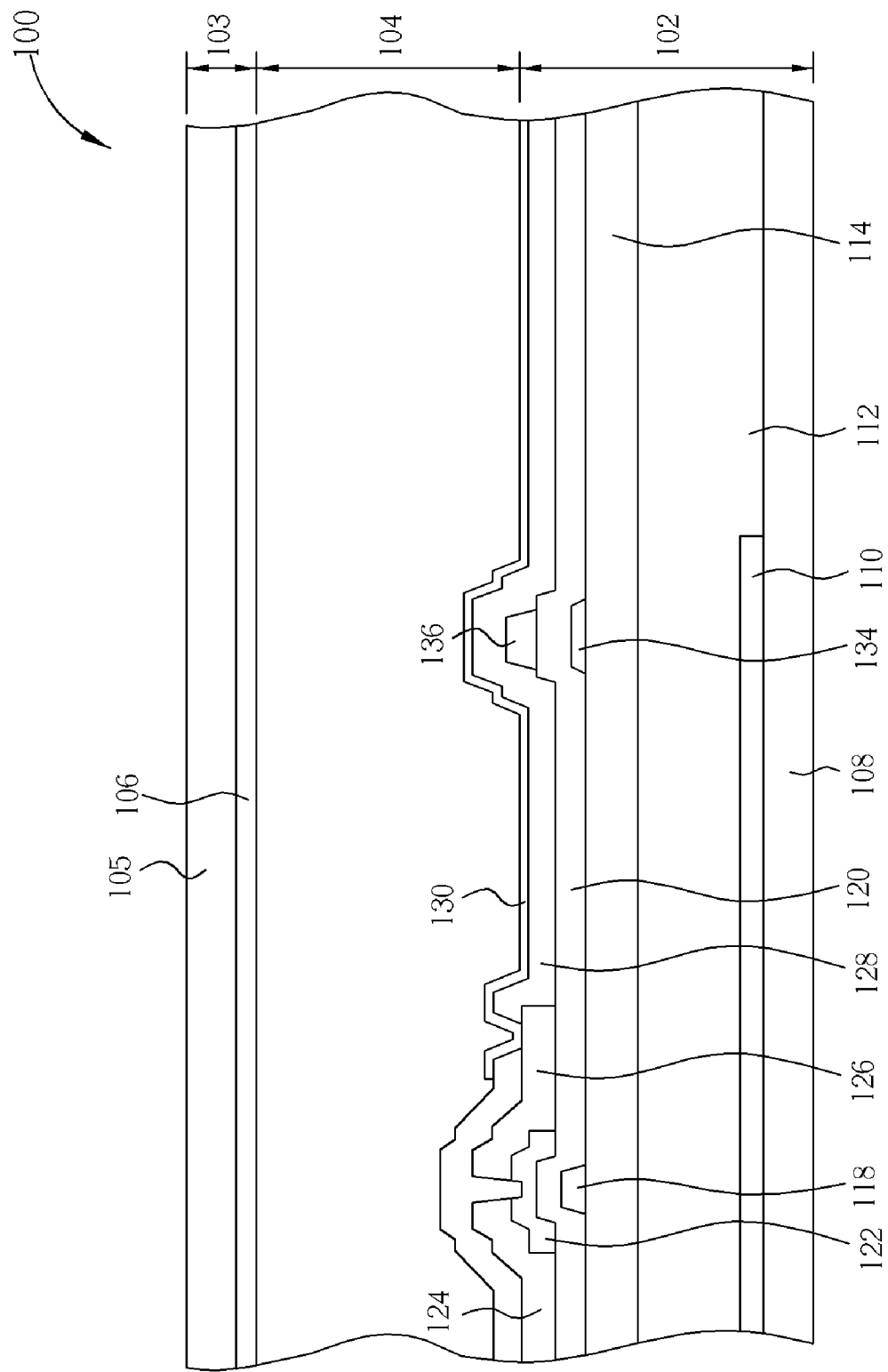
FIG. 2 illustrates a cross-section along the line A-A' shown in FIG. 1.

Referring to FIG. 1 and FIG. 2, FIG. 1 illustrates a top-view of a pixel 100 of a transflective liquid crystal display panel according to the first embodiment of the present invention. FIG. 2 illustrates a cross-section along the line A-A' shown in FIG. 1. The pixel 100 includes a bottom substrate 102 (such as first substrate), a top substrate 103 (such as second substrate), and a liquid crystal layer 104. The top substrate 103 includes a transparent substrate 105 and a common electrode 106, in which the top substrate 103 can be a vertical alignment liquid crystal display panel or a multi-domain vertical alignment liquid crystal display (MVA-LCD) panel. Instead of being disposed on the transparent substrate 105, the common electrode 106 can also be disposed on the bottom substrate 102 to form an in-plane switching liquid crystal display (IPS-LCD). The bottom substrate 102 includes a transparent substrate 108 and a color filter layer 112 disposed on the transparent substrate 108. A first reflective layer 110 is disposed on a portion of the transparent substrate 108 and between the color filter layer 112 and the transparent substrate 108 to form a reflecting region 1R. The reflecting region 1R serves to reflect white lights particularly from the ambience, for example, white light, or other color light. Typically, ambient lights are transformed into lights with colors after passing through the color filter layer 112. The remaining portion of the bottom substrate 102 forms a transmitting region 1T, in which lights from a backlight module (not shown) will penetrate the color filter layer 112 in the transmitting region to generate lights with colors.

The bottom substrate 102 also includes a first planarizing layer 114 disposed on the color filter layer 112, a switch element 116 and a capacitor 132 disposed on the first planarizing layer 114 with respect to the reflecting region 1R. The switch element 116, preferably, is a thin film transistor, in which the switch element 116 includes a gate electrode 118 electrically connected to a scan line SL, a gate insulating layer 120, a semiconductor layer 122, a source electrode 124 electrically connected to a data line DL, a drain electrode 126 electrically connected to a pixel electrode 130, and a passivation layer 128. As shown in FIG. 1, the capacitor (Cs) 132 includes a bottom electrode 134 and a top electrode 136, in which the top electrode 136 can be an extension portion extending from the drain electrode 126, but not limited thereto. The structure of the thin film transistor can be a top gate structure or a bottom gate structure, and the thin film transistor can be an N-type transistor, a P-type transistor, or combinations thereof. The material of the semiconductor layer 122 comprises single crystal silicon, amorphous silicon, polysilicon, microcrystalline silicon, or a combination thereof. The gate insulating layer 120, the first planarizing layer 114, and the passivation layer 128 can be composed of substantially identical or substantially different materials. Preferably, materials utilized for fabricating the gate insulating layer 120, the first planarizing layer 114, and the passivation layer 128 are selected from organic materials, inorganic materials, or a combination of both. Specifically, the organic materials include organosilicon, photoresist, polyethylene oxide, polymethyl methacrylate, polyesters, polyethylene compounds, or likes, or combinations thereof, and the inorganic materials include silicon nitride, silicon oxide, silicon oxynitride, silicon carbide, or others, or a combination thereof. According to the preferred embodiment of the present invention, the thin film transistor is a bottom gate thin film transistor and the semiconductor layer 122 is composed of polysilicon as an exemplification.

As shown in FIG. 2, by first forming the color filter layer 112 on the transparent substrate 108, reworks can be done directly on the color filter layer 112 if impurities or defects were found in the color filter layer 112. After the color filter layer 112 is inspected, the switch element 116 and the capacitor 132 are disposed on the inspected color filter layer 112, thus increasing the yield of the products. Additionally, by disposing, the switch element 116, the capacitor 132, the pixel electrode 130, and the color filter layer 112 on the transparent substrate 108, problems such as misalignment between two substrates commonly found in the conventional art is also prevented.

Since the capacitor 132 is disposed on the color filter layer 112 and the top electrode 136 is composed of metal, a portion of light is reflected by the top electrode 136 without passing through the color filter layer 112, thus the reflectivity of light at this region is increased. An additional second reflective layer can be formed on the color filter layer 112, such as in the present embodiment, the top electrode 136 of the capacitor 132 is used as a second reflective layer. However, if the top electrode 136 of the capacitor 132 is composed of transparent material, the bottom electrode 134 can be used as the second reflective layer.

Second Embodiment

Figure 3:
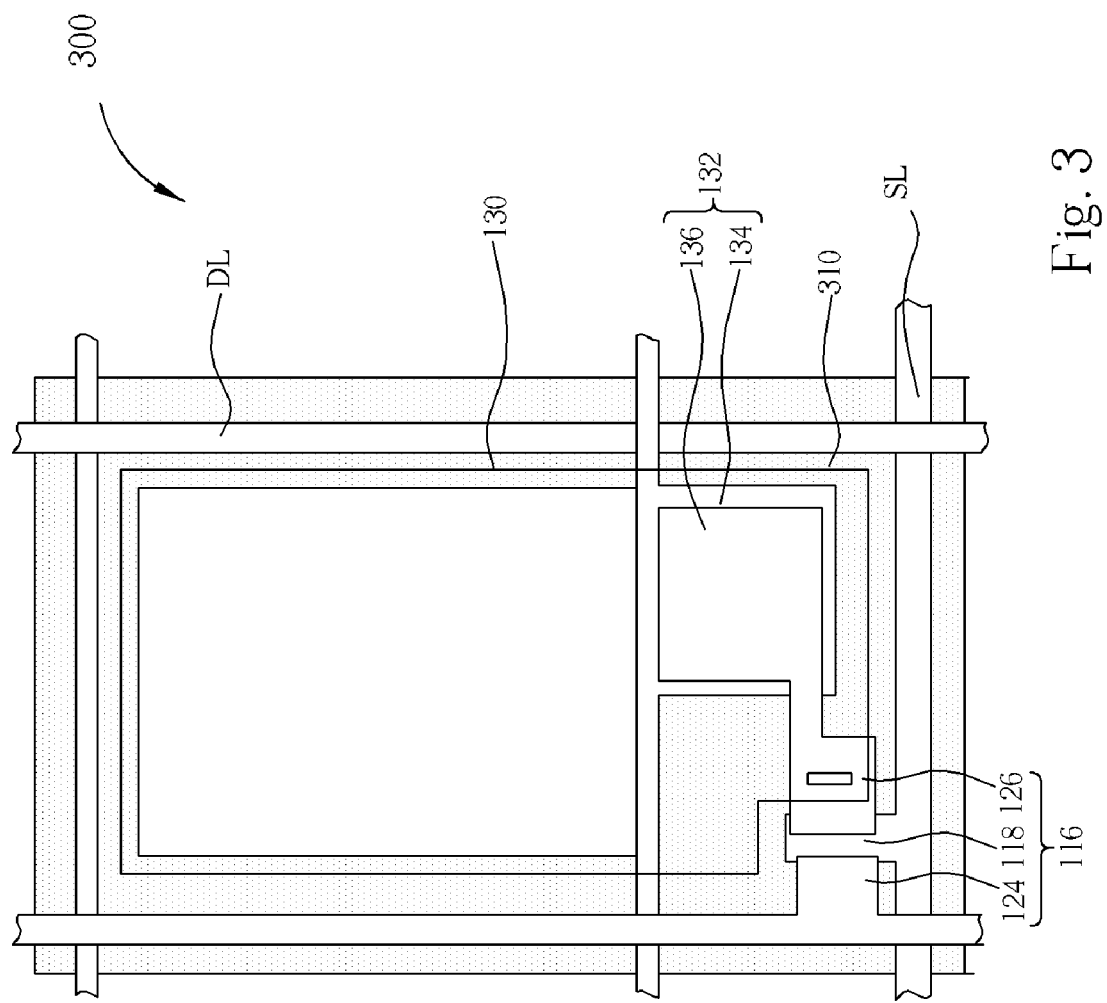
FIG. 3 illustrates a pixel 300 of a transflective liquid crystal display panel according to the second embodiment of the present invention.

FIG. 3 illustrates a pixel 300 of a transflective liquid crystal display panel according to the second embodiment of the present invention. The second embodiment is structurally similar to the first embodiment described above. However, in this embodiment, the first reflective layer 310 is not only disposed below the interval between the scan line SL and the pixel electrode 130, but also below the interval between the data line DL and the pixel electrode 130 for reflecting ambient light. Additionally, the first reflective layer 310 can also be disposed either below the interval between the scan line and the pixel electrode 130 or below the interval between the data line and the pixel electrode 130. In other words, the first reflective layer 310 is disposed below at least one of the interval between the scan line SL and the pixel electrode 130, and the interval between the data line DL and the pixel electrode 130.

In this embodiment, a first reflective layer 310 is disposed below the interval between the scan line SL and the pixel electrode 130 and the interval between the data line DL and the pixel electrode 130 as an exemplification, thus the reflective area and the intensity of the reflected light are increased accordingly.

Third Embodiment

Figure 4:
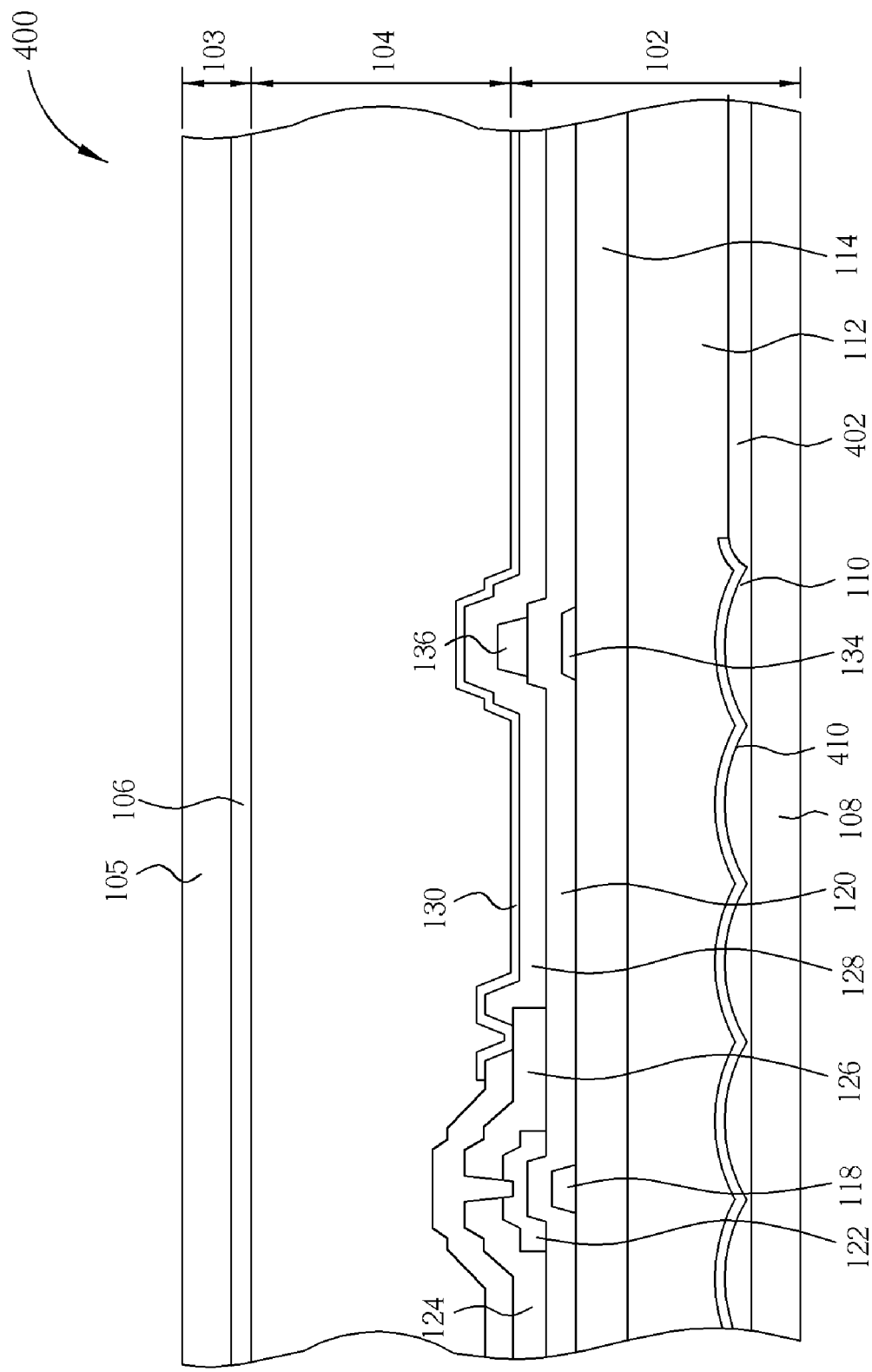
FIG. 4 illustrates a cross-section of a pixel of a transflective liquid crystal display panel according to the third embodiment of the present invention.

FIG. 4 illustrates a cross-section of a pixel 400 of a transflective liquid crystal display panel according to the third embodiment of the present invention. The third embodiment is structurally similar to the first embodiment. However, in this embodiment, the first reflective layer 410 includes a rough and uneven surface, such as a waved surface, such that the waved surface increases the reflectance of ambient lights and enhances the uniformity of light distribution. Preferably, the fabrication of the waved surface of the first reflective layer 410 can be achieved by first forming an insulating layer 402 between the transparent substrate 108 and the color filter layer 112. Thereafter, a series of exposure, development, and etching processes is performed to form a waved surface on a portion of the insulating layer 402 surface, and the first reflective layer 410 is disposed on the waved surface of the insulating layer 402. Alternatively, a series of exposure, development, and etching processes can be performed to form a waved surface on a portion of first reflective layer 410 by not using any additional layer.

Fourth Embodiment

In contrast to the first embodiment, the fourth embodiment includes a protection layer (not shown) disposed on the first planarizing layer 114, and the switch element 116 and the capacitor 132 are disposed on the passivation layer thereafter. The material of the protection layer comprises an inorganic material, such as silicon oxide, silicon nitride, silicon oxynitride, or silicon carbide. By using inorganic material to fabricate the protection layer, the stability of the layer is increased and impurities or particles passing from the planarizing layer or the color filter layer that may influence the switch element 116 and the capacitor 132 are blocked, thereby increasing the performance of the transflective liquid crystal display panel. Since the gate electrode 118 and the bottom electrode 134 are also similarly composed of inorganic material like the protection layer, phenomenon such as peeling taken place between the gate electrode 118 and the planarizing layer or between the bottom electrode 134 and the planarizing layer can also be prevented. Additionally, the material of the protection layer can comprise an organic material having strong stability, such as epoxy compounds, acrylic compounds, copolymers, or a combination thereof/with inorganic materials.

Fifth Embodiment

Figure 5:
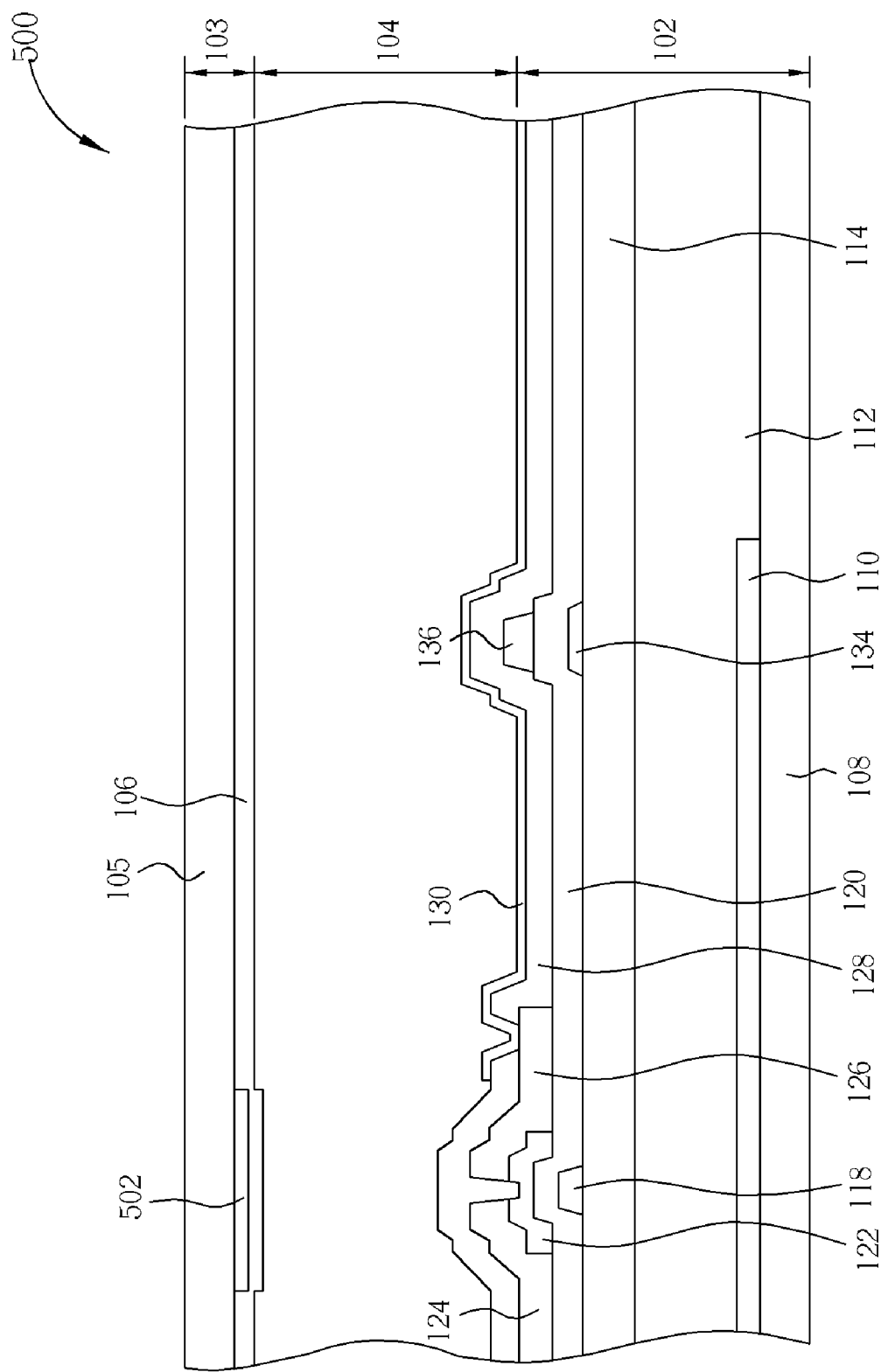
FIG. 5 illustrates a cross-section of a pixel of a transflective liquid crystal display panel according to the fifth embodiment of the present invention.

FIG. 5 illustrates a cross-section of a pixel 500 of a transflective liquid crystal display panel according to the fifth embodiment of the present invention. The fifth embodiment is structurally similar to the first embodiment. However, in this embodiment, a light-blocking layer 502 is disposed between the transparent substrate 105 and the common electrode 106. The light-blocking layer 502 is at least disposed and substantially corresponds to the switch element 116 formed on the bottom substrate 102 to prevent ambient light from generating photo current after penetrating the switch element 116 from the top substrate 103. Preferably, the material of the light-blocking layer 502 comprises inorganic material, organic material, or a combination thereof. The inorganic material includes metals such as chromium, gold, aluminum, molybdenum, neodymium, titanium, tantalum, tungsten, metal alloys, metal compounds such as nitrides or oxides, or material containing silicon, or others, or combinations thereof.

Sixth Embodiment

Figure 6:
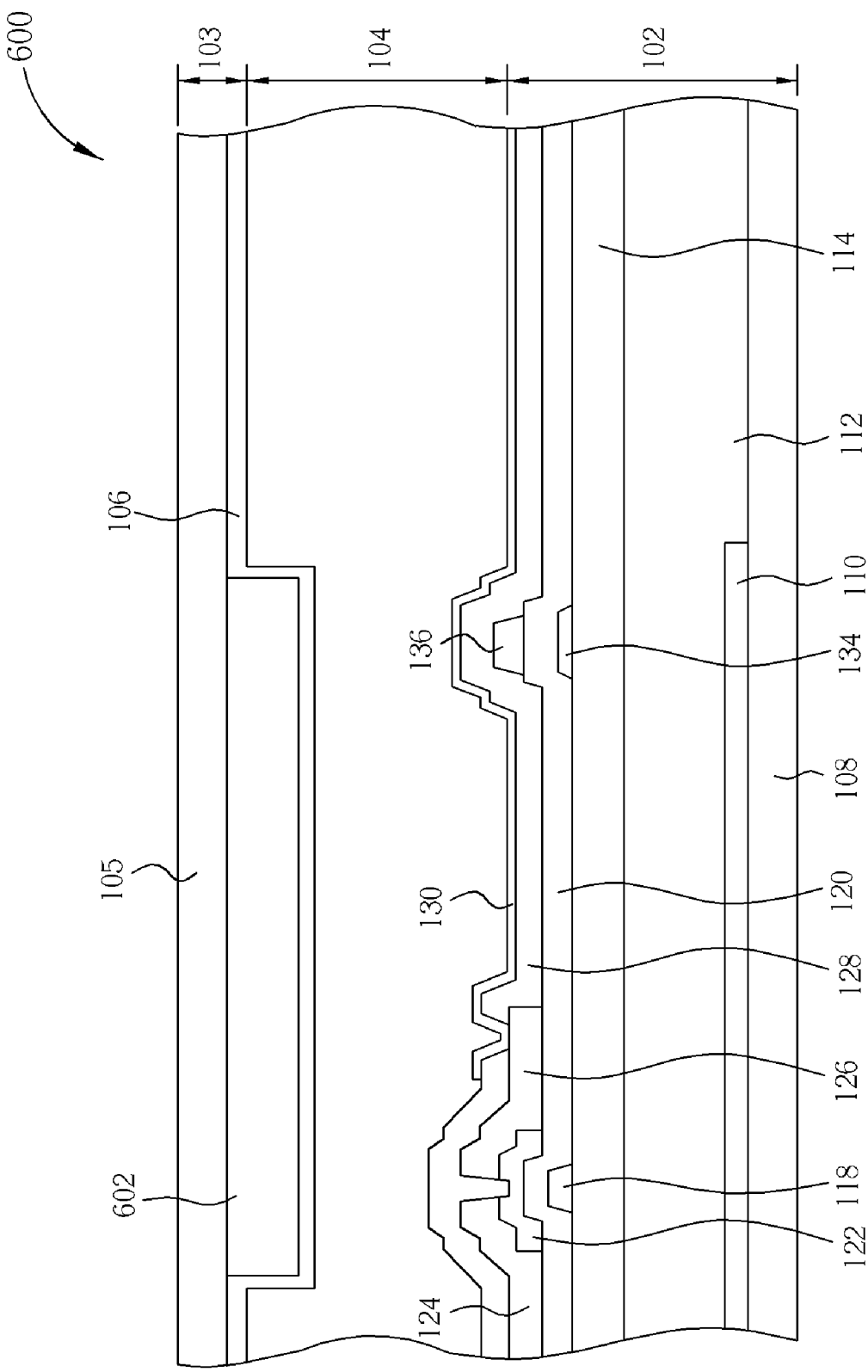
FIG. 6 illustrates a cross-section of a pixel of a transflective liquid crystal display panel according to the sixth embodiment of the present invention.

FIG. 6 illustrates a cross-section of a pixel 600 of a transflective liquid crystal display panel according to the sixth embodiment of the present invention. The sixth embodiment is structurally similar to the first embodiment. However, in this embodiment, a diffusing layer 602 is disposed between the transparent substrate 105 and the common electrode 106. The diffusing layer 602 is disposed with respect to the reflective region 1R, such that reflected light from the ambient environment would scatter after passing through the diffusing layer 602, thus resulting in a much more even distribution. The transmitting region 1T still allows lights illuminating from the backlight module (not shown) to go through the color filter layer 112 for generating lights of colors. The diffusing layer 602 can be a transparent layer with/without scattering particles, such as a layer composed of epoxy, organic materials, acrylics, copolymers, or similar materials, or combinations thereof.

Seventh Embodiment

Figure 7:
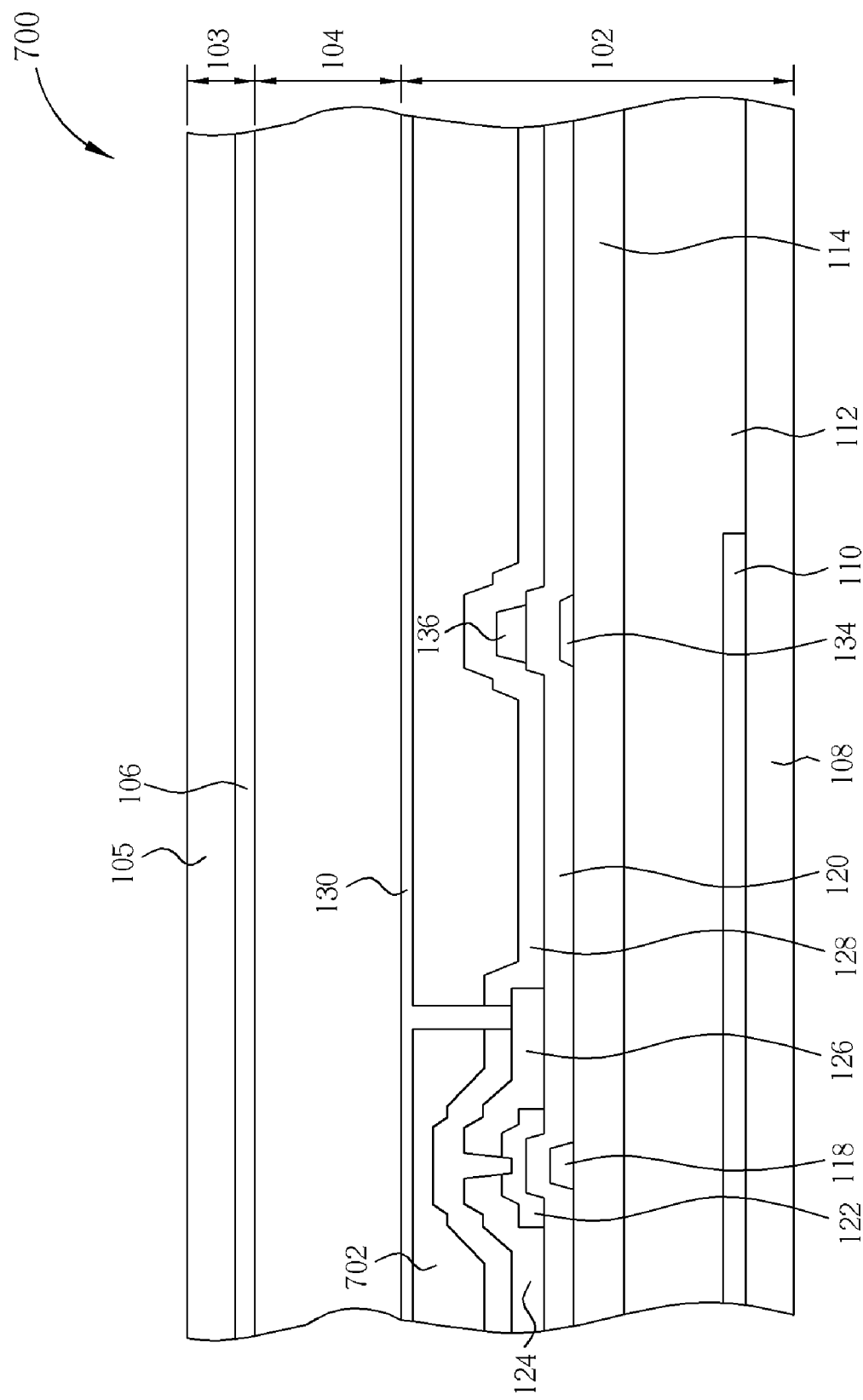
FIG. 7 illustrates a cross-section of a pixel of a transflective liquid crystal display panel according to the seventh embodiment of the present invention.

FIG. 7 illustrates a cross-section of a pixel 700 of a transflective liquid crystal display panel according to the seventh embodiment of the present invention. The seventh embodiment is structurally similar to the first embodiment. However, in this embodiment, a second planarizing layer 702 is disposed on the passivation layer 128, and the pixel electrode 130 is disposed on the second planarizing layer 702 and electrically connected to the drain electrode 126.

Preferably, the second planarizing layer 702 includes a depth of about 2 μm to about 3 μm or more than about 3 μm, such that even if the pixel electrode 130 overlaps at least one of the switch element 116, the scan line SL, and the data line DL, the pixel electrode 130 is not influenced by the parasitic capacitance generated by the overlapping region. By having this design, the area of the pixel electrode 130 can be enlarged, thereby increasing the aperture ratio and brightness of the display panel. The second planarizing layer 702 can be composed of substantially the same material or substantially different material as the first planarizing layer 114.

Eighth Embodiment

Figure 8:
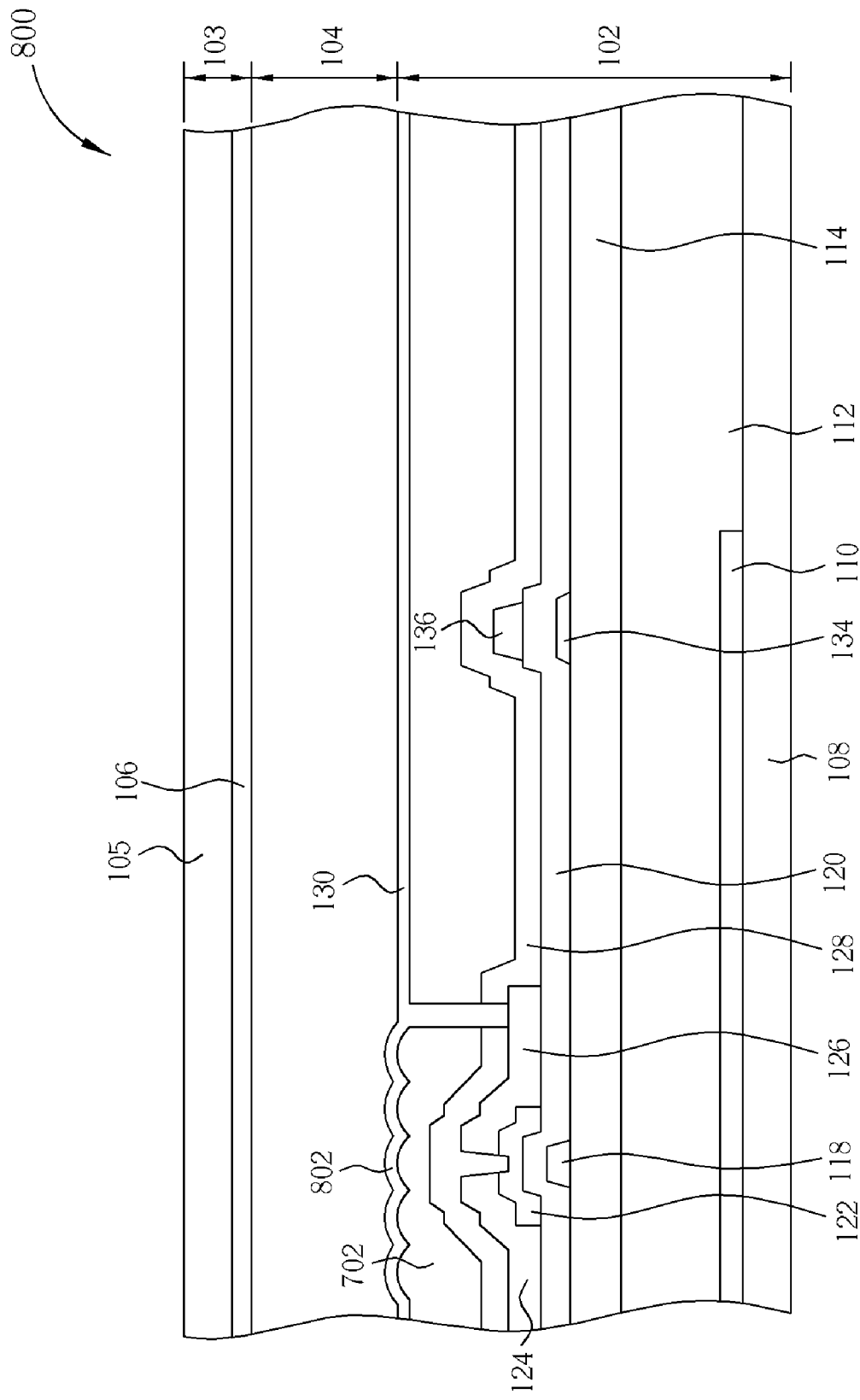
FIG. 8 illustrates a cross-section of a pixel of a transflective liquid crystal display panel according to the eight embodiment of the present invention.

FIG. 8 illustrates a cross-section of a pixel 800 of a transflective liquid crystal display panel according to the eight embodiment of the present invention. The eighth embodiment is structurally similar to the seventh embodiment. However, in this embodiment, a reflective electrode 802 is disposed on the second planarizing layer 702, in which the reflective electrode 802 also includes a rough and uneven surface, such as a waved surface to enhance the scatter of ambient light. The reflective electrode 802 is electrically connected to the drain electrode 126, and the remaining portion of the panel not covered by the reflective electrode 802 and/or the first reflective layer 110 is used to form a transmitting region. In the transmitting region, light is generated from a backlight module (not shown) and resulting into colors after passing through the color filter layer 112. In this embodiment, both the top electrode 136 of the capacitor 132 and the reflective electrode 802 can be used as a second reflective layer. Preferably, the fabrication of the waved surface of the reflective electrode 802 can be achieved by first performing a series of exposure, development, and etching processes on a portion of the second planarizing layer 702 to form a waved surface, and then forming the reflective electrode 802 on the waved surface of the second planarizing layer 702. Alternatively, a series of exposure, development, and etching processes can be performed to form a waved surface on a portion of the reflective electrode 802 by not using any additional layer. In addition, the first reflective layer 110 can be formed with/without a waved surface, as shown in FIG. 4.

Ninth Embodiment

Figure 9:
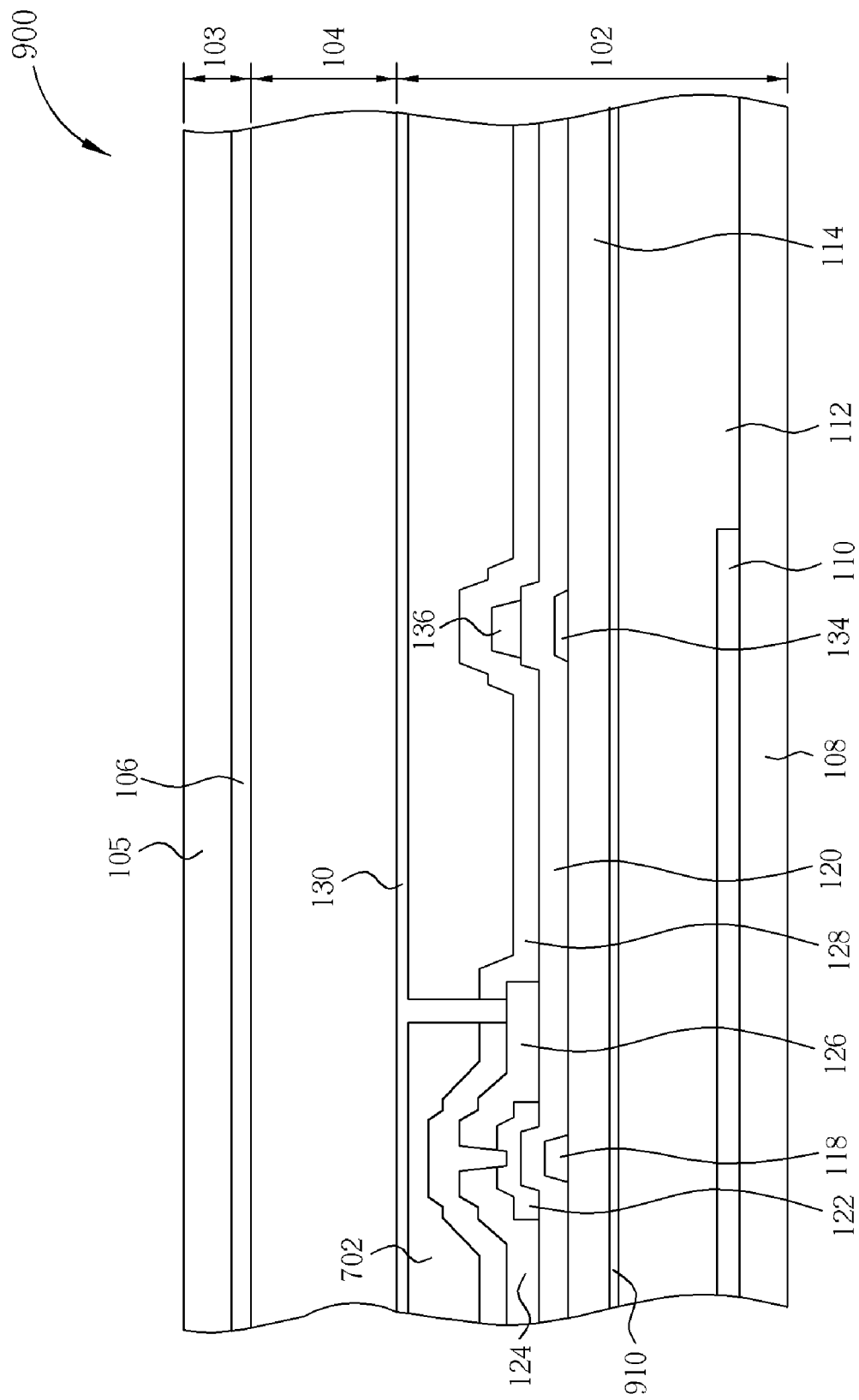
FIG. 9 illustrates a cross-section of a pixel of a transflective liquid crystal display panel according to the ninth embodiment of the present invention.

FIG. 9 illustrates a cross-section of a pixel 900 of a transflective liquid crystal display panel according to the ninth embodiment of the present invention. The ninth embodiment is structurally similar to the seventh embodiment. However, in this embodiment, a protection layer 910 is disposed on the first planarizing layer 114, and the switch element 116 and the capacitor 132 are disposed on the protection layer 910 thereafter.

It should be noted that in addition to the protection layer 910, structures described in the previous embodiments can also be incorporated in the present embodiment. For instance, as shown in FIG. 3, the first reflective layer 310 disposed below at least one of the interval between the scan line and the pixel electrode 130 and below the interval between the data line and the pixel electrode 130 can be incorporated for reflecting ambient lights. Additionally, as shown in FIG. 5, the light-blocking layer 502 disposed between the transparent substrate 105 and the common electrode 106 can be incorporated, in which the light-blocking layer 502 is at least disposed substantially corresponding to the switch element 116 of the bottom substrate. The diffusing layer 602, disposed substantially corresponding to the reflective region 1R, and between the transparent substrate 105 and the common electrode 106, as shown in FIG. 6, can also be incorporated for enhancing the uniformity of light distribution after ambient lights are scattered via the diffusing layer 602. Moreover, the structures shown in FIG. 7 and FIG. 8 can also be incorporated. As shown in FIG. 7, a second planarizing layer 702 is disposed on the passivation layer 128, and the pixel electrode 130 is disposed on the second planarizing layer 702 and electrically connected to the drain electrode 126. As shown in FIG. 8, a reflective electrode 802 is disposed on the second planarizing layer 702 and electrically connected to the drain electrode 126, in which the reflective electrode 802 includes a rough and uneven surface, such as a waved surface for facilitating the scatter of reflected lights.

Tenth Embodiment

Figure 10:
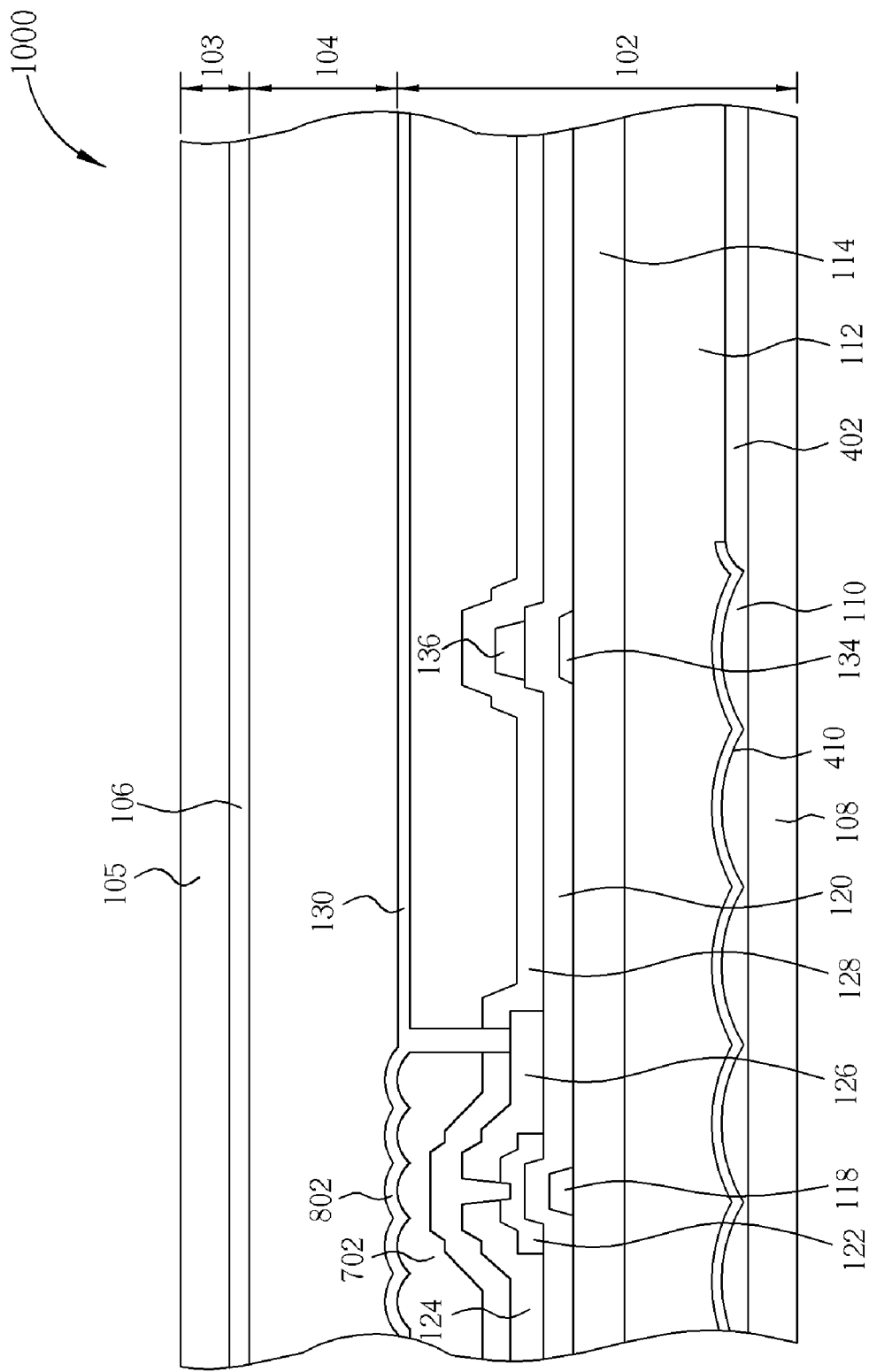
FIG. 10 illustrates a cross-section of a pixel of a transflective liquid crystal display panel according to the tenth embodiment of the present invention.

FIG. 10 illustrates a cross-section of a pixel 1000 of a transflective liquid crystal display panel according to the tenth embodiment of the present invention. Preferably, the present embodiment includes a combination of various structures taken from the previous embodiments. For instance, structures from FIG. 4 and FIG. 8 are combined in this embodiment, in which the first reflective layer 410 includes a rough and uneven surface, such as a waved surface for enhancing the scatter and uniformity of the reflected ambient lights. A reflective electrode 802 is disposed on the second planarizing layer 702 and electrically connected to the drain electrode 126, in which the reflective electrode 802 includes a rough and uneven surface, such as a waved surface for facilitating the scatter of reflected ambient lights. The remaining portion of the substrate not covered by the reflective electrode 802 and/or the first reflective layer 410 serves as a transmitting region to allow lights projecting from a backlight module (not shown) to the color filter layer 112 to produce lights having colors. Preferably, the convex portion of the first reflective layer 410 is formed partially or completely corresponding to the convex portion of the reflective electrode 802 and/or concave portion of the reflective electrode 802. Hence, by using the waved surface of the first reflective layer 410 and the reflective electrode, the reflectivity of the panel with respect to the ambient lights is increased significantly.

Additionally, the reflectivity of the display panel can be further enhanced by disposing the diffusing layer 602 shown in FIG. 6 between the transparent substrate 105 and the common electrode 106. As the reflectivity of the ambient light increases, the light-blocking layer 502 shown in FIG. 5 can be further applied in this embodiment to prevent light leakage. The light-blocking layer 502 is preferably disposed substantially corresponding to the switch element of the bottom substrate.

Eleventh Embodiment

Figure 11:
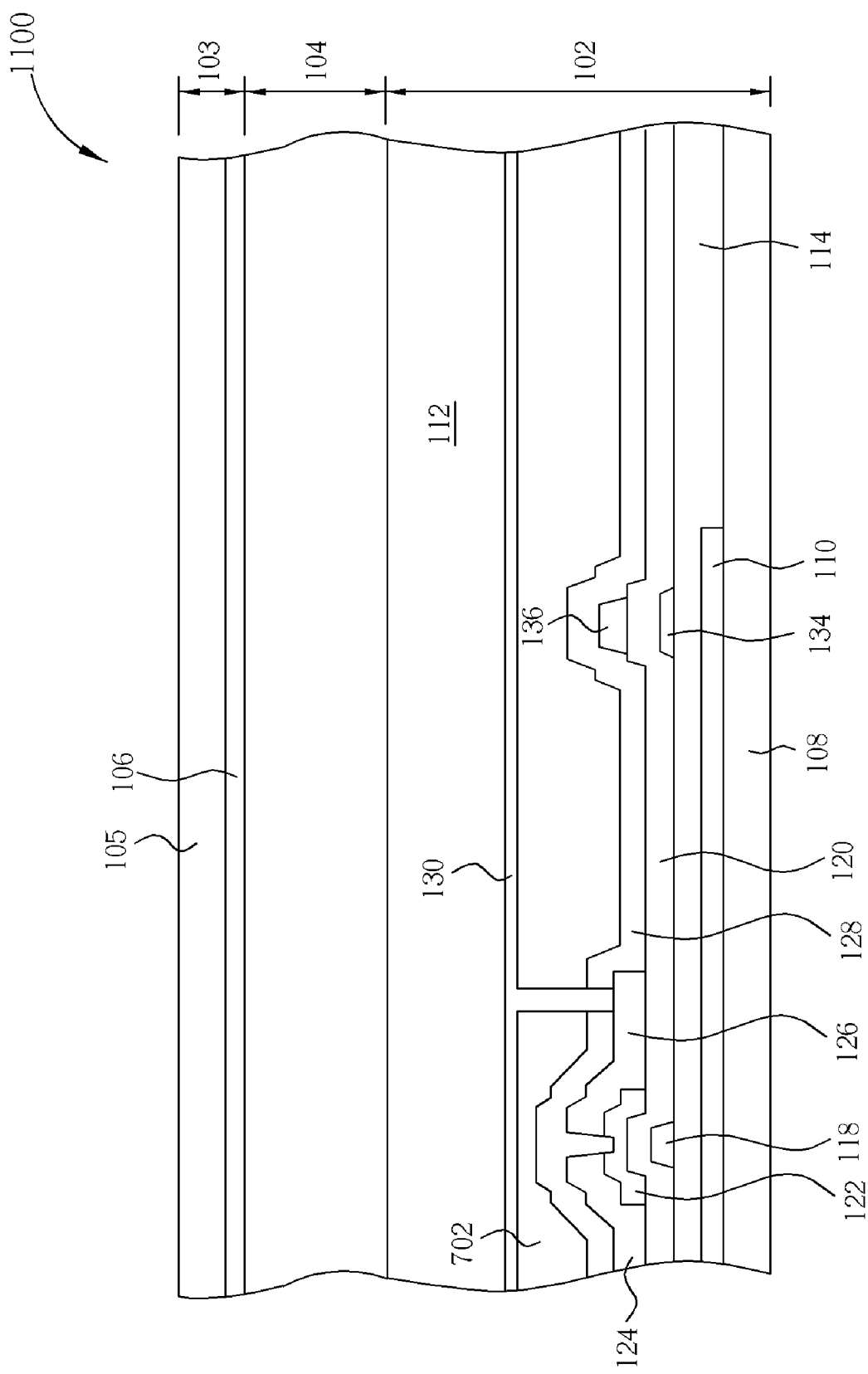
FIG. 11 illustrates a cross-section of a pixel of a transflective liquid crystal display panel according to the eleventh embodiment of the present invention.

FIG. 11 illustrates a cross-section of a pixel 1100 of a transflective liquid crystal display panel according to the eleventh embodiment of the present invention. The eleventh embodiment is structurally similar to the previous embodiments. However, in this embodiment, the switch element, such as the thin film transistor of the pixel 1100 and the capacitor 132 are disposed under the color filter layer 112. Nevertheless, at least one of the first reflective layer 410 having a rough and uneven surface, such as a waved surface, the light-blocking layer 502, the diffusing layer 602, the reflective electrode 802 having a waved surface, and the passivation layer 910 described from the first embodiment to the tenth embodiment can be incorporated into the present embodiment, which are all within the scope of the present invention. Additionally, a protection layer (not shown), such as an alignment film, a planarizing layer, a buffering layer, or a combined layer thereof can be selectively disposed on the color filter layer 112.

Twelfth Embodiment

Figure 12:
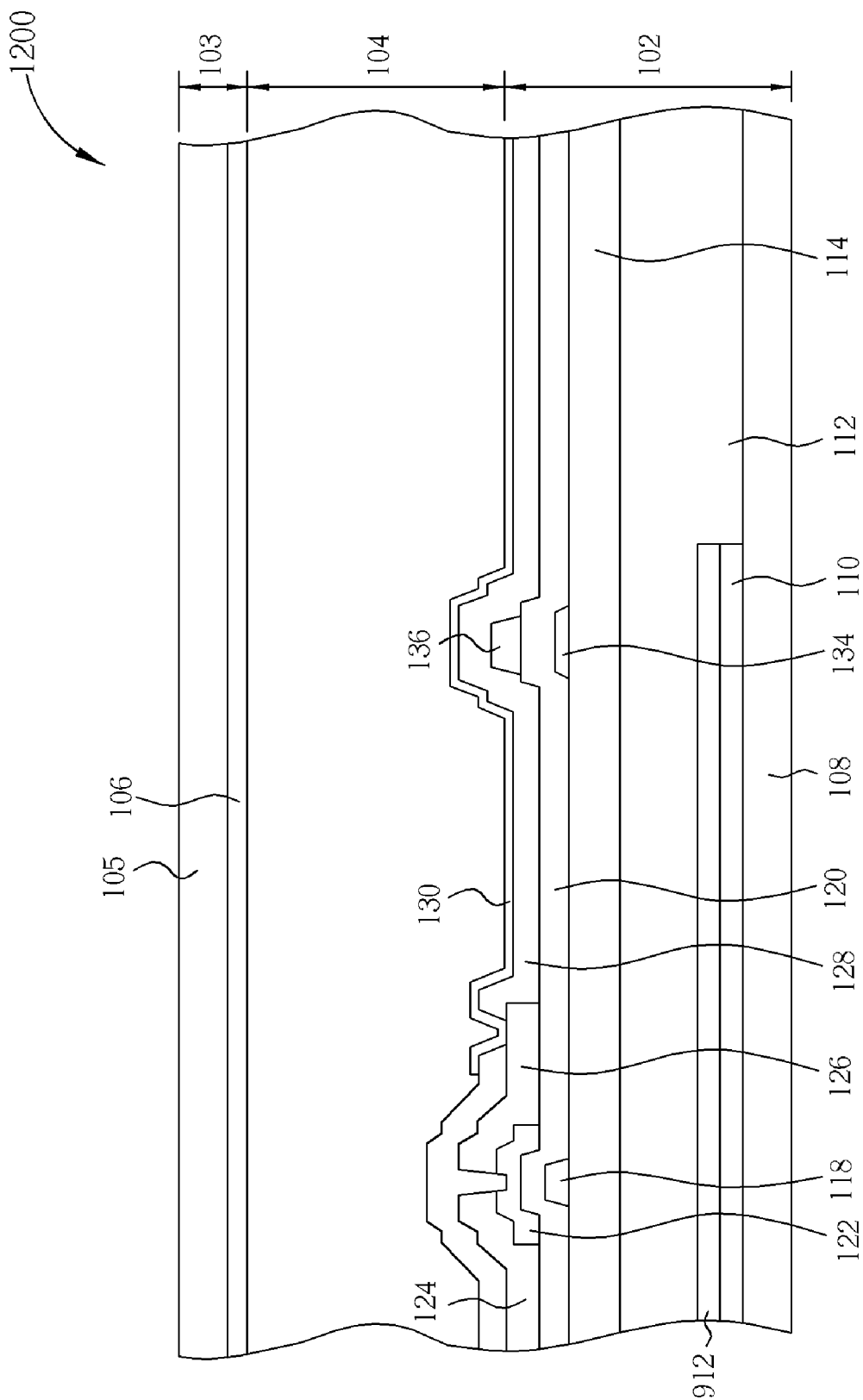
FIG. 12 illustrates a cross-section of a pixel of a transflective liquid crystal display panel according to the twelfth embodiment of the present invention.

FIG. 12 illustrates a cross-section of a pixel 1200 of a transflective liquid crystal display panel according to the twelfth embodiment of the present invention. The twelfth embodiment is structurally similar to the previous embodiments. However, this embodiment specifically forms a diffusing layer 912 between the first reflective layer 110 and the color filter layer 112. The position of the diffusing layer 912 preferably allows the ambient light passing the first reflective layer 110 to produce a much more even distribution, in which the diffusing layer 912 can be composed of a transparent layer with/without scattering particles therein. For instance, the diffusing layer 912 can be comprised of epoxy compounds, an organic material, acrylic compounds, copolymers, or others, or combinations thereof/with inorganic materials. Additionally, preferred, at least one of the first reflective layer 410, the light-blocking layer 502, the reflective electrode 802 having a rough and uneven surface, such as a waved surface, and the protection layer 910 disclosed in the above-mentioned embodiments can be further utilized in the present embodiment, which are all within the scope of the present invention.

It should be noted that the surface of the color filter layer 112 disposed on the bottom substrate 108 is substantially flat, but not limited thereto. Hence, the surface of the color filter layer 112 can be formed according to the profile of the layer disposed under it, such as having a substantially stepped profile or a stairway profile. For instance, as shown in the twelfth embodiment, after the first reflective layer 110 is formed on the bottom substrate 108 and the diffusing layer 912 is formed on the first reflective layer, a substantially stepped profile would appear between the surface of the diffusing layer 912 and the surface of the bottom substrate 108. In other words, an uneven profile would appear between the surface of the color filter layer 112 disposed on the diffusing layer 912 and the surface of the color filter layer 112 disposed on the bottom substrate, such as the substantially stepped profile shown in the figure. Moreover, the above-mentioned embodiments of the present invention describing the light of colors include a single color or a multi-color, in which the color can be red, green, blue, white, yellow, violet, cyan, magenta, black, pink, brown, dark green, colorless, or other colors shown in the color gamut of the color coordinates, such as Commission Internationale de L'Eclairage (CIE), color combination indexes, or other indexes.

Preferably, the fabrication of the color filter layer is completed before the fabrication for the thin film transistors and by disposing the thin film transistors on the color filter layer, the color filter can be reworked directly without affecting other devices such as the switch element and the capacitor. Additionally, by integrating both the color filter layer and the thin film transistor on a substrate, problems such as misalignment between two substrates can be reduced. Moreover, a reflective layer can be disposed on the color filter of the reflective region for reflecting ambient lights without going through the color filter layer, thereby increasing the intensity of reflected lights and the reflectivity of the display panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transflective liquid crystal display panel, comprising:
a first substrate;
a second substrate, disposed opposite to the first substrate;
a liquid crystal layer, disposed between the first substrate and the second substrate; and
a plurality of pixels arranged in a manner of a matrix between the first substrate and the second substrate, wherein each of the pixels comprises a reflecting region and a transmitting region, and a capacitor located in the reflecting region and between the liquid crystal layer and the first substrate, each of the pixels comprising:
a color filter layer, disposed on the first substrate and located in the reflecting region and the transmitting region;
a first reflective layer, disposed between the color filter layer and the first substrate and located in the reflecting region;
at least one switch element, disposed in the reflecting region; and
a second reflective layer, disposed in the reflecting region, wherein the second reflective layer is an electrode of the capacitor.

2. The transflective liquid crystal display panel of claim 1, wherein each of the pixels comprises a wire and a pixel electrode, the wire and the pixel electrode are disposed on the color filter layer and electrically connected to the switch element, and the first reflective layer is positioned below the interval between the wire and the pixel electrode.

3. The transflective liquid crystal display panel of claim 1, wherein each of the pixels comprises a planarizing layer disposed on the switch element and the color filter layer, wherein the second reflective layer is disposed on the planarizing layer.

4. The transflective liquid crystal display panel of claim 3, wherein a portion of the planarizing layer comprises a waved surface, wherein the second reflective layer is disposed on the waved surface.

5. The transflective liquid crystal display panel of claim 1, wherein the second reflective layer comprises a waved surface.

6. The transflective liquid crystal display panel of claim 5, wherein the first reflective layer comprises a waved surface.

7. The transflective liquid crystal display panel of claim 6, wherein each of the pixels comprises an insulating layer having a waved surface disposed between the first reflective layer and the first substrate.

8. The transflective liquid crystal display panel of claim 6, further comprising a light-blocking layer, disposed on the second substrate, and substantially corresponding to the switch element.

9. The transflective liquid crystal display panel of claim 8, further comprising a diffusing layer, disposed on the second substrate, and substantially corresponding to the reflecting region.

10. The transflective liquid crystal display panel of claim 1, wherein the first reflective layer comprises a waved surface.

11. The transflective liquid crystal display panel of claim 10, wherein each of the pixels comprises an insulating layer having a waved surface disposed between the first reflective layer and the first substrate.

12. The transflective liquid crystal display panel of claim 1, wherein each of the pixels comprises a protection layer disposed between the color filter layer and the switch element.

13. The transflective liquid crystal display panel of claim 1, further comprising a light-blocking layer, disposed on the second substrate, and substantially corresponding to the switch element.

14. The transflective liquid crystal display panel of claim 1, further comprising a diffusing layer, disposed on the second substrate, and substantially corresponding to the reflecting region.

15. The transflective liquid crystal display panel of claim 1, further comprising a diffusing layer, disposed on the first substrate, and between the color filter layer and the first reflective layer.

16. The transflective liquid crystal display panel of claim 1, wherein the switch element is disposed on the color filter layer.

17. The transflective liquid crystal display panel of claim 1, wherein the switch element is disposed under the color filter layer.

* * * * *